(12) United States Patent
Dehlsen (10) Patent No.: US 9,074,577 B2
(45) Date of Patent: Jul. 7, 2015

(54) WAVE ENERGY CONVERTER SYSTEM

(71) Applicant: Dehlsen Associates, LLC, Santa Barbara, CA (US)

(72) Inventor: James G. P. Dehlsen, Santa Barbara, CA (US)

(73) Assignee: Dehlsen Associates, LLC, Santa Barbara, CA (US)

( * ) Notice: Subject to any disclaimer, the term of this patent is extended or adjusted under 35 U.S.C. 154(b) by 0 days.

(21) Appl. No.: 13/841,931

(22) Filed: Mar. 15, 2013

(65) Prior Publication Data

US 2014/0265339 A1    Sep. 18, 2014

(51) Int. Cl.

| F03B 13/10 | (2006.01) |
|---|---|
| F03B 13/12 | (2006.01) |
| H02P 9/04 | (2006.01) |
| F03B 13/18 | (2006.01) |

(52) U.S. Cl.
CPC .............. *F03B 13/1845* (2013.01); *F03B 13/18* (2013.01); *F03B 13/187* (2013.01); *Y02E 10/38* (2013.01); *Y02E 10/22* (2013.01)

(58) Field of Classification Search
CPC ......... Y02E 10/38; Y02E 10/28; Y02E 10/20; Y02E 10/47; F03B 13/187; F03B 13/20; F03B 13/10; F03B 13/182; F03B 13/1845; F03B 13/1815; F03B 13/1875; F05B 2240/97; F05B 2240/93; F05B 2240/917; E02B 9/08; B63B 2035/4466; B63B 21/50; B63B 22/02; B63B 35/00; B63B 35/4406; B63B 43/06; F04B 35/004; F16C 17/024; F24J 2002/5479; H01L 31/045

USPC ........... 290/42, 43, 53, 54; 60/495–502, 504, 60/505; 417/330–333; 416/7
See application file for complete search history.

(56) References Cited

U.S. PATENT DOCUMENTS

| 738,996 A * | 9/1903 | Hagen ........................... 417/332 |
| 1,502,511 A * | 7/1924 | Marvin ........................... 60/501 |
| 2,501,696 A | 3/1950 | Souczek |
| 2,630,683 A | 3/1953 | Wemp |

(Continued)

FOREIGN PATENT DOCUMENTS

| CN | 202500712 U | 10/2012 |
| DE | 2910052 A1 | 9/1980 |

(Continued)

OTHER PUBLICATIONS

English translation of Claims in JP Publication No. 2011-132943.

(Continued)

*Primary Examiner* — Tulsidas C Patel
*Assistant Examiner* — Charles Reid, Jr.
(74) *Attorney, Agent, or Firm* — San Diego IP Law Group LLP (57) ABSTRACT

The invention is a wave energy device which optimizes energy conversion from waves with a stable submerged platform coupled to compliant chain of floats ("pods") which are connected to the platform by piston pumps. Wave action drives pumps to deliver pressurized water to a hydro turbine coupled to an electric generator for delivery of electric power to shore via a submarine cable. Alternatively, the pressurized water may be delivered to shore through pipes on the ocean floor, to generate electric power, also as input flow for reverse osmosis potable water production and for cooling applications.

16 Claims, 9 Drawing Sheets

(56) References Cited

U.S. PATENT DOCUMENTS

| | | | |
|---|---|---|---|
| 2,726,556 A | 12/1955 | Greenlee | |
| 3,029,902 A | 4/1962 | Jarvis | |
| 3,161,015 A | 12/1964 | Knowles et al. | |
| 3,756,028 A | 9/1973 | Bopp et al. | |
| 3,786,634 A | 1/1974 | Rodler, Jr. | |
| 3,848,464 A | 11/1974 | Scheipner et al. | |
| 4,076,463 A | 2/1978 | Welczer | |
| 4,143,522 A | 3/1979 | Hamrick et al. | |
| 4,155,673 A | 5/1979 | Yashima | |
| 4,173,432 A | 11/1979 | Vines | |
| 4,174,192 A * | 11/1979 | Daddario | 417/333 |
| 4,193,368 A | 3/1980 | DeGraaf et al. | |
| 4,335,319 A | 6/1982 | Mettersheimer, Jr. | |
| 4,341,959 A | 7/1982 | Ambli | |
| 4,368,692 A | 1/1983 | Kita | |
| 4,376,620 A | 3/1983 | Colston | |
| 4,383,182 A | 5/1983 | Bowley | |
| 4,392,060 A * | 7/1983 | Ivy | 290/53 |
| 4,415,280 A | 11/1983 | Agrawal | |
| 4,480,966 A | 11/1984 | Smith | |
| 4,498,017 A | 2/1985 | Parkins | |
| 4,505,638 A | 3/1985 | Sugino et al. | |
| 4,594,853 A | 6/1986 | Raichlen et al. | |
| 4,698,969 A | 10/1987 | Raichlen et al. | |
| 4,742,241 A | 5/1988 | Melvin | |
| 4,754,157 A | 6/1988 | Windle | |
| 4,776,772 A | 10/1988 | Everett | |
| 4,781,023 A | 11/1988 | Gordon | |
| 4,792,700 A | 12/1988 | Ammons | |
| 4,850,190 A * | 7/1989 | Pitts | 60/398 |
| 4,851,704 A | 7/1989 | Rubi | |
| 4,864,152 A | 9/1989 | Pedersen | |
| 4,868,408 A | 9/1989 | Hesh | |
| 4,883,411 A | 11/1989 | Windle | |
| 5,052,902 A | 10/1991 | Labrador | |
| 5,061,131 A | 10/1991 | Petty et al. | |
| 5,078,628 A | 1/1992 | Garis, Jr. | |
| 5,244,359 A | 9/1993 | Slonim | |
| 5,359,229 A | 10/1994 | Youngblood | |
| 5,440,176 A | 8/1995 | Haining | |
| 5,507,943 A | 4/1996 | Labrador | |
| 5,889,336 A | 3/1999 | Tateishi | |
| 5,975,865 A * | 11/1999 | Manabe | 417/331 |
| 6,109,863 A | 8/2000 | Milliken | |
| 6,226,989 B1 | 5/2001 | Fredriksson et al. | |
| 6,244,785 B1 * | 6/2001 | Richter et al. | 405/195.1 |
| 6,310,406 B1 | 10/2001 | Van Berkel | |
| 6,327,957 B1 | 12/2001 | Carter, Sr. | |
| 6,389,810 B1 | 5/2002 | Nakomcic | |
| 6,472,768 B1 | 10/2002 | Salls | |
| 6,531,788 B2 | 3/2003 | Robson | |
| 6,644,027 B1 * | 11/2003 | Kelly | 60/498 |
| 6,648,589 B2 | 11/2003 | Williams | |
| 6,726,439 B2 | 4/2004 | Mikhail et al. | |
| 6,756,695 B2 | 6/2004 | Hibbs et al. | |
| 6,856,036 B2 | 2/2005 | Belinsky | |
| 6,922,993 B2 | 8/2005 | Kemp | |
| 7,076,949 B2 | 7/2006 | Fernandez Gomez et al. | |
| 7,183,664 B2 | 2/2007 | McClintic | |
| 7,199,481 B2 | 4/2007 | Hirsch | |
| 7,199,484 B2 | 4/2007 | Brashears | |
| 7,245,041 B1 | 7/2007 | Olson | |
| 7,279,803 B1 | 10/2007 | Bosley | |
| 7,291,936 B1 | 11/2007 | Robson | |
| 7,307,356 B2 | 12/2007 | Fraenkel | |
| 7,331,762 B2 | 2/2008 | Fraenkel | |
| 7,364,410 B2 | 4/2008 | Lin | |
| 7,368,828 B1 | 5/2008 | Calhoon | |
| 7,418,820 B2 | 9/2008 | Harvey et al. | |
| 7,436,086 B2 | 10/2008 | McClintic | |
| 7,441,988 B2 | 10/2008 | Manchester | |
| 7,442,002 B2 | 10/2008 | Mondl | |
| 7,453,165 B2 | 11/2008 | Hench | |
| 7,485,979 B1 | 2/2009 | Staalesen | |
| 7,489,046 B2 | 2/2009 | Costin | |
| 7,525,213 B2 | 4/2009 | Nagata et al. | |
| 7,541,688 B2 | 6/2009 | Mackie | |
| 7,569,943 B2 | 8/2009 | Kovach et al. | |
| 7,633,177 B2 | 12/2009 | Platt | |
| 7,656,055 B2 | 2/2010 | Torres et al. | |
| 7,658,594 B2 | 2/2010 | Christensen et al. | |
| 7,682,126 B2 * | 3/2010 | Parker | 415/3.1 |
| 7,728,454 B1 | 6/2010 | Anderson, Jr. | |
| 7,737,568 B2 | 6/2010 | Vowles et al. | |
| 7,737,570 B2 | 6/2010 | Costin | |
| 7,768,145 B2 | 8/2010 | Susman et al. | |
| 7,781,903 B2 * | 8/2010 | Buffard et al. | 290/42 |
| 7,808,120 B2 * | 10/2010 | Smith | 290/42 |
| 7,823,380 B2 | 11/2010 | Ghouse | |
| 7,851,936 B2 | 12/2010 | Bolin | |
| 7,863,767 B2 | 1/2011 | Chapple et al. | |
| 7,877,994 B2 | 2/2011 | Bull et al. | |
| 7,888,590 B2 | 2/2011 | Niederer | |
| 7,893,553 B1 | 2/2011 | Calhoon | |
| 7,900,444 B1 | 3/2011 | McBride et al. | |
| 7,902,687 B2 | 3/2011 | Sauer et al. | |
| 7,932,620 B2 | 4/2011 | Plant, Jr. | |
| 7,936,077 B2 | 5/2011 | Lehoczky | |
| 7,944,078 B1 | 5/2011 | Wang | |
| 7,958,731 B2 | 6/2011 | McBride et al. | |
| 7,963,110 B2 | 6/2011 | Bollinger et al. | |
| 8,093,735 B1 | 1/2012 | Rosiglioni | |
| 8,099,955 B2 | 1/2012 | Estefen et al. | |
| 8,188,613 B2 * | 5/2012 | Lee | 290/54 |
| 8,222,762 B2 | 7/2012 | Borgen | |
| 8,237,304 B2 * | 8/2012 | Dehlsen et al. | 290/54 |
| 8,256,988 B1 * | 9/2012 | Haber | 405/29 |
| 8,338,973 B2 | 12/2012 | Suzuki | |
| 8,680,703 B2 * | 3/2014 | Savoie | 290/53 |
| 8,690,477 B2 * | 4/2014 | Dempster | 405/76 |
| 8,698,337 B2 * | 4/2014 | Wen | 290/53 |
| 2002/0139286 A1 * | 10/2002 | Lee et al. | 114/264 |
| 2006/0125242 A1 | 6/2006 | Fraenkel | |
| 2006/0218908 A1 | 10/2006 | Abou-Raphael | |
| 2007/0130929 A1 | 6/2007 | Khan et al. | |
| 2007/0193265 A1 | 8/2007 | Skotte et al. | |
| 2007/0266704 A1 * | 11/2007 | Bull et al. | 60/398 |
| 2008/0012345 A1 * | 1/2008 | Parker | 290/54 |
| 2008/0053084 A1 | 3/2008 | Stansby et al. | |
| 2008/0093858 A1 | 4/2008 | Hench | |
| 2008/0258465 A1 | 10/2008 | Johnston | |
| 2008/0260548 A1 | 10/2008 | Ahdoot | |
| 2009/0309366 A1 | 12/2009 | Moore | |
| 2010/0013229 A1 | 1/2010 | Da Costa | |
| 2010/0034670 A1 * | 2/2010 | Smith | 417/53 |
| 2010/0043425 A1 | 2/2010 | Dragic | |
| 2010/0132695 A1 * | 6/2010 | Hinderling et al. | 126/646 |
| 2010/0194112 A1 | 8/2010 | Vince | |
| 2010/0213710 A1 * | 8/2010 | Rhinefrank et al. | 290/42 |
| 2010/0229545 A1 | 9/2010 | Griffin et al. | |
| 2010/0276935 A1 * | 11/2010 | Dehlsen et al. | 290/54 |
| 2010/0326343 A1 | 12/2010 | Hunt | |
| 2010/0329866 A1 | 12/2010 | Hunt | |
| 2011/0006534 A1 | 1/2011 | Achard et al. | |
| 2011/0012354 A1 | 1/2011 | Onsrud | |
| 2011/0042955 A1 | 2/2011 | Benson | |
| 2011/0089689 A1 * | 4/2011 | Gregory | 290/42 |
| 2011/0225965 A1 | 9/2011 | Van Niekerk et al. | |
| 2011/0304144 A1 * | 12/2011 | Dehlsen et al. | 290/53 |
| 2012/0090313 A1 | 4/2012 | Myklebust | |
| 2013/0008158 A1 * | 1/2013 | Hon | 60/506 |
| 2013/0031897 A1 * | 2/2013 | Hagemann et al. | 60/505 |
| 2013/0074758 A1 * | 3/2013 | Powers et al. | 114/294 |
| 2013/0161948 A1 * | 6/2013 | Sarokhan | 290/42 |

FOREIGN PATENT DOCUMENTS

| | | |
|---|---|---|
| EP | 0796784 A1 | 9/1997 |
| EP | 1283159 A1 | 2/2003 |
| GB | 2087819 A | 6/1982 |
| GB | 2096963 A | 10/1982 |
| GB | 2450624 A | 12/2008 |
| JP | 2011-132943 A | 7/2011 |
| JP | 2012-002203 A | 1/2012 |

(56) References Cited

FOREIGN PATENT DOCUMENTS

| | | | |
|---|---|---|---|
| JP | 2012-041920 A | 3/2012 |
| WO | WO 99/28623 A1 | 6/1999 |
| WO | WO 0001945 A1 | 1/2000 |
| WO | WO 0017519 A1 | 3/2000 |
| WO | WO 00/70218 A1 | 11/2000 |
| WO | WO 0210589 A1 | 2/2002 |
| WO | WO 03013948 A2 | 2/2003 |
| WO | WO 03/098033 A1 | 11/2003 |
| WO | WO 2005/021960 A1 | 3/2005 |
| WO | WO 2005065024 A2 | 7/2005 |

OTHER PUBLICATIONS

English translation of Claims in JP Publication No. 2012-041920.
English translation of Claims in JP Publication No. 2012-002203.
European Patent Office [International Searching Authority], Written Opinion of the International Searching Authority for International Application No. PCT/IB2009/006614, Jul. 2009, 14 pages.
Independent Natural Resources, Inc., The Seadog Pump, 6 pages.
Notification of Transmittal, International Search Report and Written Opinion of Int'l App. No. PCT/US2014/030169, mailed Oct. 2, 2014, 11 pages.

* cited by examiner

WAVE ENERGY CONVERTER SYSTEM

BACKGROUND OF THE INVENTION

1. Field of Invention

The present invention relates to hydrokinetic power-generating systems, methods, and devices that convert wave energy into electricity.

2. Description of Related Art

Ocean waves are a major, largely untapped energy resource. Research and development in this area is driven by the need to generate electricity from renewable energy resources, particularly in view of the rising level of $CO_2$ in the earth's atmosphere from combustion of carbon fuels and the resulting impact on climate from global warming. A wave energy converter (WEC) captures energy from ocean surface waves, usually for electricity generation. However, prior attempts at wave power generation have not been widely accepted for various reasons.

Wave power is available in low-speed, high pulsating forces, and the motion of forces is not in a single direction. The force of wave action is concentrated in bursts of about 3 to 8 seconds and may repeat in random patterns both in wave period and size. Most commercial electric generators require a more steady flow of source energy. Furthermore any apparatus deployed on the ocean must be able to survive infrequent very large waves, raising the capital cost and maintenance.

The key to commercial viability of wave technology is a competitive levelized cost of energy (LCOE). Wave power is competitive when the total life cycle cost of power generation is low. The total cost includes the capital and maintenance costs, parts replacement and electric power delivery costs, and this in relation to the electric power generated, determines the "life-cycle" cost of energy. It is therefore desirable to provide a method and apparatus of obtaining optimum energy extraction from ocean waves at the least cost for the generating system. Moreover, a WEC must have minimal impact on the marine environment, such as fishing grounds and beach shoreline and must not interfere with ocean navigation.

U.S. Pat. No. 4,851,704 to Rubi, the entire disclosure of which is incorporated by reference herein, discloses a wave action electricity generation system that includes a floating platform that supports the system components on the water. Wave motion energy is converted into mechanical energy and an electricity generator converts the mechanical power transfer strokes into electrical energy. The converter includes a cylinder containing a lubricant, in opposed cylinder chamber portions, a first heavily weighted piston that is slidably and freely disposed within the body of the cylinder. The heavily weighted piston is slidably responsive to the wave motion energy of the body of water and is used to compress the fluid to produce respective compression power strokes in each of the cylinder chamber portions. The energy in the compression stroke is received by a second and third piston located in the cylinder chamber portions that further produce power transfer strokes through the ends of the cylinder. The power transfer strokes associated with the first and second pistons are further converted by a geared transmission to rotary motion that turns a flywheel coupled to an electricity generator. The electrical energy produced is then distributed to a remote power station via a power transmission line. This system relies on the rocking motion of the platform to convert the wave surface action, to movement of masses which are harnessed to drive an electric generator. This design captures the surface movement of waves and does not, per se, address the more substantial amount of energy available with a point absorber float, capturing the float displacement volume in a rising wave and the potential gravity forces on the wave as it recedes.

U.S. Pat. No. 5,889,336, the entire disclosure of which is incorporated by reference herein, to Tateishi discloses a power generating installation located in a shallow water area of the sea for generating power utilizing a shallow water wave. The system comprises a mooring located either in the sea or at the sea bottom, a chain having one end connected with the mooring and the other end to which a dead-weight is attached. A float is provided with a generator and a rotary member for rotating engaged with the chain. Rotary force of the rotary member produced when the float moves up and down according to an up-and-down motion of the wave is transmitted to the generator, thereby generating power. Substantial added float buoyancy is required to displace the mass of the dead weight and the chain connected thereto, along with the mass of the power conversion system within the float.

U.S. Pat. No. 7,453,165, the entire disclosure of which is incorporated by reference herein, to Hench discloses a method for harnessing power associated with ocean waves and converting that power into electricity. The apparatus is a buoy that houses a vertically oriented central shaft, a pendulum, and a generator. As the buoy tilts from the vertical under the influence of wave motion, the pendulum is accelerated and rotates about the central shaft. A centrally placed generator is mechanically driven by the rotating pendulum so that the pendulum's kinetic energy is converted into electricity. This design captures surface movement of waves and does not per se, address the more substantial amount of energy available with a point absorber float, capturing the float displacement volume in a rising wave and the potential gravity force as the wave recedes.

U.S. Pat. No. 7,808,120, the entire disclosure of which is incorporated by reference herein, to Smith discloses a wave energy generation apparatus utilizing a number of floats connected to a spar buoy via lever arms. The apparatus is anchored to the seabed at a desired location. In use, wave motion lifts and lowers the floats, thereby driving the lever arms to compress a hydraulic fluid, which is used to drive an electrical generator. This design is based on floats attached by lever arms to a central body. The hydrodynamic and buoyancy forces provided by wave action require structurally massive float lever arms, which in turn add to the buoyancy requirement of the system.

Yet, these prior art systems are not capable of producing cost-effective, utility-scale power output to meet modern energy needs. What is needed is a power-generating device for capturing power from ocean wave motion that provides a stable submerged platform and allows mechanically linked floats to have maximum exposure to wave action and concentrate the forces therefrom to the power converters. It is further desirable to provide a method of capturing the power of ocean waves that is efficient, cost effective to manufacture and maintain and is capable of withstanding severe weather events.

SUMMARY OF THE INVENTION

The present invention overcomes the deficiencies and drawbacks of the prior art by using the force of float buoyancy to deliver a linear force, which is reacted against a stable submerged platform. Energy conversion occurs when the linear force is converted to rotational torque (torsional force) either by a mechanical or hydraulic system between the float and the submerged platform to drive a generator. Therefore, two areas of this invention, among others, are the platform and the floats ("pods" or "podchain") and the interaction among them.

The platform is a submerged horizontal structure with vertical buoyancy chambers at each end, extending above the ocean surface. This results in minimal backbone exposure to wave action, resulting in platform stability, essential to maximizing energy extraction from waves. Since the pods react on the power converter connected to the backbone, as waves pass, any platform pitching reduces the power transfer to the power converter. Pod wave loading on the backbone is offset with reaction plates (heave plates) connected to a rigid boom, which extends downward under each buoyancy chamber.

Energy extraction from wave is accomplished with specifically configured and interconnected pods. The pod shape is oval and relatively flat which with wave action results in a high rate of volumetric displacement. The cables connecting the pods, allow the pods a degree of movement on the ocean surface, concentrating the force of the wave to the power converter connected to the pod and the stable backbone.

The capacity for extreme sea state survival is made possible with the combination of: 1) soft interlinking of the pods and the podchain connected to the platform buoyancy chambers at each end, providing system structural resiliency; 2) multiple pod connections to the power converters attached to the backbone, to distribute loads to various attachment points; 3) by allowing the pods to weathervane "going with the flow" and reducing the rate of pod volumetric displacement to extreme sea states; and 4) by opening pod chamber valves to reduce pod mass (ballast) and related potential inertia to wave forces. The overall effect of this is to reduce the impact of extreme forces on the structure.

In an embodiment of the invention, a wave energy converter system comprises: a submerged U-shaped backbone structure, wherein the backbone structure comprises a buoyancy chamber at each end; the backbone connecting structure coupled to each buoyancy chamber; a plurality of pods; a plurality of power converters, wherein each of the plurality of pods is coupled to the backbone structure via at least one of the plurality of power converters; a first cable coupling one end of the plurality of pods to the end support frames; a second cable coupling an opposite end of the plurality of pods to the end support frames; wherein displacement of the plurality of pods by the force of the waves drives the plurality of power converters to facilitate generation of electricity. The buoyancy chamber at each end of the backbone structure is coupled to a heave plate via a boom (pylon). To facilitate deployment, the pylon has a variable length. The heave plate is foldable. The first cable and the second cable are coupled to an edge of a support frame via a traveler. The traveler is able to freely move vertically in a slot disposed along the edge of a respective support frame. The power converter comprises a mechanical or hydraulic system to convert the linear action of the pods to a torsional force for the electric generator. The generator may be equipped with torque control or other electrical, mechanical or hydraulic means to apply a measured counterforce to pod heave. The system further includes a means for adjusting the yaw of the wave energy converter system.

In another embodiment of the invention, a wave energy converter system comprises: a U-shaped support structure, wherein the U-shaped support structure has a center of buoyancy located above its center of mass, a plurality of interconnected pods; and a plurality of power converters, wherein each of the plurality of pods is coupled to react against the U-shaped support structure through at least one of the plurality of power converters, the plurality of pods are coupled to one another via at least one cable, and displacement of the plurality of pods by wave energy drives the plurality of power converters to facilitate generation of electricity. The U-shaped support structure is coupled to at least one heave plate via a pylon. The at least one heave plate is foldable. The at least one heave plate may comprise water valves. The system may further comprise a means for adjusting the yaw of the wave energy converter system. Each of the plurality of pods comprises one or more water valves for varying displacement of a pod.

In yet another embodiment of the invention, a pod for use in a wave energy converter system comprises: a ball connector and a sliding track mounted on two opposite ends of the pod, wherein the ball connector and the sliding track permit the pod to pitch within a predetermined arc, and wherein the sliding track may vary from an engaged state and a disengaged state, the disengaged state allowing the ball connector on the sliding track to shift forward and allow the pod to weathervane in response to buoyancy and hydrodynamic forces of a wave. The disengaged state is triggered by a central control command. The arc is ninety degrees. The pod may further comprise a means for varying the displacement of the pod.

In yet another embodiment of the invention, a pod for use in a wave energy converter system comprises: a float, wherein the float has a width, a length, and a depth, the length being greater the width, the width being greater than the depth, and wherein the float is adapted to lie flat on a water surface. The float is shaped as a tri-axial ellipsoid with distinct semi-axes A, B, and C, wherein the length of axis C is greater than the length of axis B, and the length of axis B is greater than the length of axis A.

An advantage of the present invention is that it provides efficient power transfer from the waves vertical linear force on the pods, which is reacted against power converters connected to the submerged stable platform to generate electricity. The combination of efficient wave energy conversion, through resilient pods which focuses force to the power converters connected to the stable backbone, results in competitively priced power compared to other wave energy devices. The present invention's simple submerged backbone structure is easily scalable and avoids surface forces and wind loading. The present invention is well suited to operate in extreme marine conditions.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Further features and advantages of the invention, as well as the structure and operation of various embodiments of the invention, are described in detail below with reference to the accompanying FIGS. 1-8. Although the invention is described in the context of deployment in an ocean marine environment, one of ordinary skill in the art recognizes that the invention can be implemented in any type of a fluid environment such as, but not limited to lakes that are subject to wave energy.

The present invention provides a wave energy extraction technique that optimizes energy conversion from waves by utilizing a stable submerged platform, i.e., backbone structure, coupled to an array of ("pods" or "podchain") connected to the platform by power converters. Wave action drives the power converters. The novel elements include, among other things, the architecture and structural design of the backbone (platform) for its pitch resistance; heave plates for platform pitch stability with wave loading; and the podchain which efficiently captures the vertical linear reversing forces of wave action for conversion to a torsional force for electric power generation. Critical issues for wave energy extraction are 1) efficient transfer of power from waves to pods, and the pods to the power converters, and 2) system survival in extreme sea conditions. The present application is generally directed to the overall wave energy extraction system and more particularly, the architecture and structure of the backbone and the array of pods coupled thereto. The wave energy converters are described generally as several types which may be employed such as, but not limited to hydraulic-based systems or mechanical-based systems. For example, in a hydraulic-based embodiment of the invention, the wave energy converters deliver pressurized fluid to a hydraulic turbine or motor coupled to an electric generator for delivery of electric power to shore via a submarine cable. Alternatively, the pressurized water may be delivered to shore through pipes on the ocean floor to generate electric power on land or also as input flow for reverse osmosis potable water production and for various cooling applications.

Figure 1:
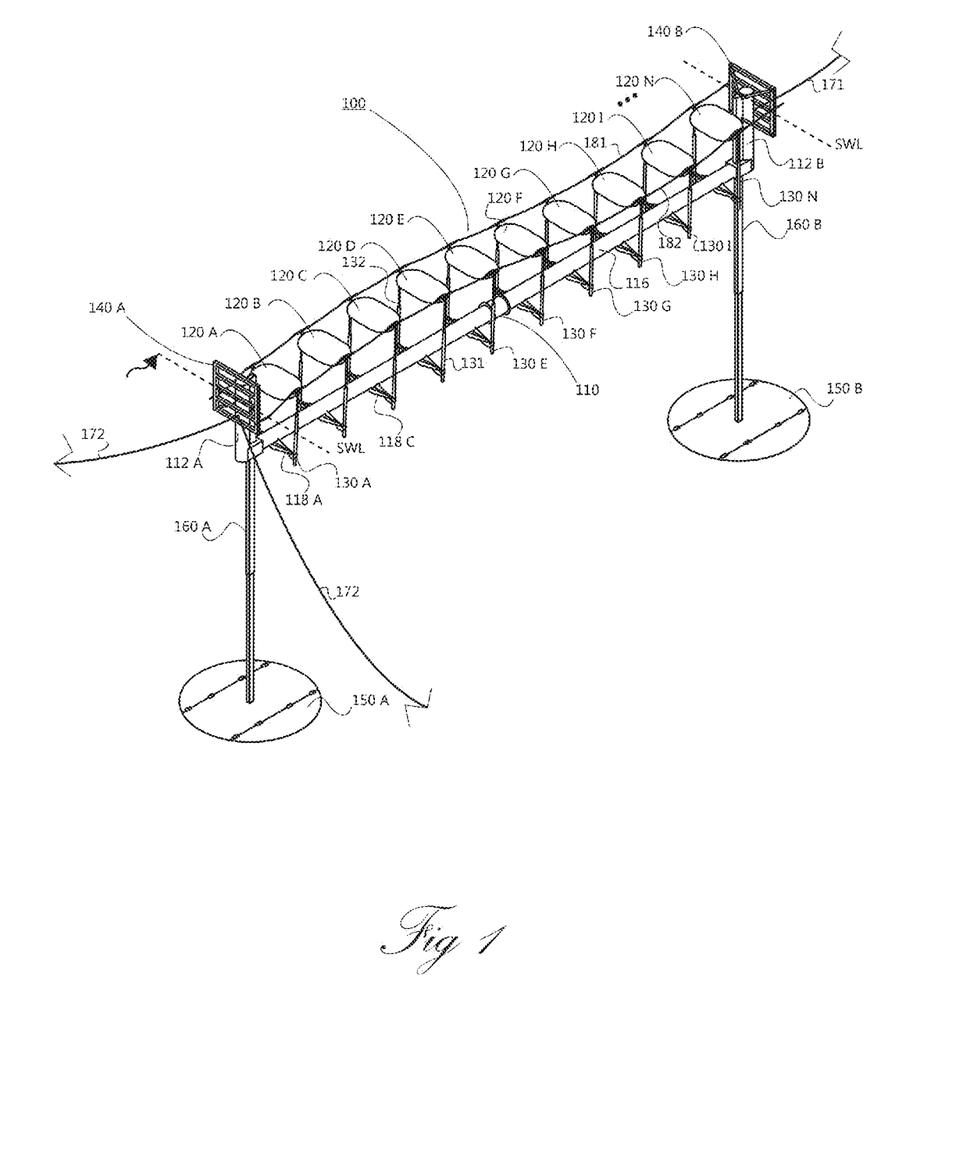
FIG. 1 illustrates a wave energy converter system according to an embodiment of the invention.

FIG. 1 illustrates a wave energy converter system 100 according to an embodiment of the invention. The wave energy converter system 100 comprises a submerged U-shaped structure 110, an array ("chain") of pods 120A-N and respective wave power converters 130A-N, structural supports 140A and 140B, and heave plates 150A and 150B. One of ordinary skill in the art recognizes that any number "N" of pods 120 and respective wave power converters 130 and intermediate structural supports 140A and 140B, and heave plates 150A and 150B may be used. In an embodiment of the invention, each power converter 130 comprises a pump cylinder 131 with respective shaft and piston 132 located on each of the opposite sides of the pod 120. Vertical movement of a pod 120 displaces a shaft and piston 132 through the piston cylinders which together form a pump 131.

The structure 110 provides pitch stability in marine wave conditions, i.e., swells, of amplitudes greater than one meter. The structure 110 comprises two buoyancy chambers 112A and 112B located at opposite ends and separated by 100-200 meters. About 10 meters below the ocean surface, the buoyancy chambers 112A and 112B are connected to a longitudinal tubular steel structure 116 with some negative buoyancy, thus acting as a keel connecting the two end buoyancy chambers 112A and 112B and providing a center of buoyancy above the center of mass. This structure 110 is also referred to as the "backbone" of the structure. The combination of the keel type structure 116 with vertical buoyancy chambers 112A and 112B at each end of the structure 110, minimizes pitching due to 1) inertia of the mass of the overall structure 110 relative to the 2) end buoyancy chambers 112A and 112B, which provide small volume displacement to passing waves, thus exerting small wave lifting force on the structure. Between the vertical end buoyancy chambers 112A and 112B, and connected thereto by the support frames 140A and 140B, is the array of linked pods 120A-N, whereby each pod 120 is also connected to a respective power converter 130A-N mounted on spars 118A-N fixed to and extending from the stable submerged backbone 110. With this spar/backbone configuration, wave energy capture is maximized compared to a platform floating on the surface, where platform pitching by waves, reduces the reactive force to the power converters 130A-N.

Platform stability against the lifting force of passing waves is substantially immobilized by heave plates 150A and 150B rigidly connected by a respective pylon 160A or 160B from the bottom end of the buoyancy chambers 112A and 112B, such that the lifting force of a wave on the pods 120A-N is resisted by the surface area of the heave plates 150A and 150B against the mass of a portion of the vertical column of water surrounding the top and bottom surface of the heave plates 150A and 150B.

The wave energy converter system 100 further comprises a forward mooring line 171 attached to the bow buoyancy chamber 112B, extending to an anchor (not shown) on the seafloor. The aft buoyancy chamber 112A is attached to a mooring line 172 on a winch (not shown), extending laterally from the port and starboard sides to anchors (not shown) at each end on the seafloor. The winch allows one side of the mooring line to be let out while the other side is brought in, to alter the azimuth orientation (yawing) of the platform relative the direction of incoming waves ("wave line"). The energy extracted from waves is a function of the length of the wave front engaged by the wave energy converter system 100. The operating position of the wave energy converter system 100 is in a range of up to 50° on either side of perpendicularity to the wave line (referred to as "SWL" in FIG. 1). Yawing is effected by the winching system, hauling the aft end of the wave energy converter system 100 to the port or starboard side for optimum wave exposure. The survival orientation for the wave energy converter system 100 is perpendicular to the wave line, thus minimizing the frontal exposure to the oncoming waves.

The pods 120A-N are interconnected to form a chain of pods for greater survivability to the loads on the structure associated with extreme sea states (e.g., the 50 year return wave). The pods comprising the pod chain 120A-N are resilient in both their pitch and roll axis, to relieve the hydraulic forces on the submerged surface of the pods, which do not serve to focus the energy of the wave to the pumping processes of the power converter. In a preferred embodiment of the invention, the connections between the pods 120A-N and the power converters 130A-N to the backbone 110, utilize ball joints to reduce structural loads by allowing the pod chain 120A-N to have some horizontal movement on the surface, relative to the backbone 110, with wave action focused on maximizing pumping force. Unlike ocean surface platforms which require extremely robust connecting arms between the floats and the backbone, the invention requires no such arm, reducing mass and cost while enhancing survivability.

In an embodiment of the invention, the pods 120A-N are flotation devices (pods) constructed from steel, fiberglass, and/or concrete and operate on the ocean surface. The pods 120A-N are wide oval in form, lying flat on the ocean surface; they have shallow draft and a small amount of free board, whereby high volumetric displacement occurs rapidly with a rising wave. As illustrated, the pods 120A-N are oval shaped (i.e. pod shaped) to maximize pod frontal exposure to waves when the backbone is at a ~45° degree angle to the wave front. The pods 120A-N are linked to each other by cables 181 and 182 that traverse the entire length of the array of pods 120A-N. The ends of cables 181 and 182 are attached to travelers on the support frames 140A and 140B. In an alternative embodiment of the invention, flexible line, chain or rigid tubes may be used for cables 181 and 182.

Figure 2:
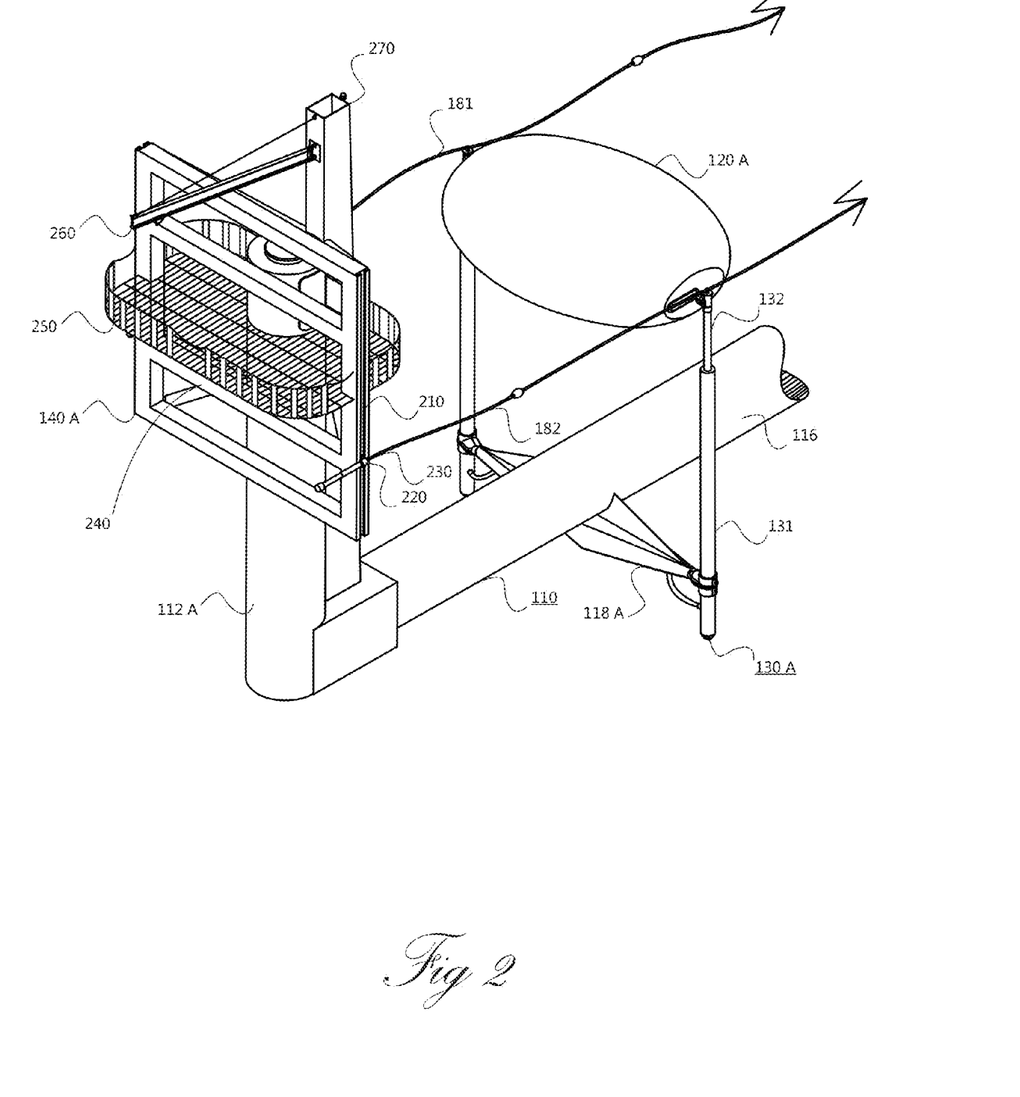
FIG. 2 illustrates the support frames of the wave energy converter system of FIG. 1 according to an embodiment of the invention.

FIG. 2 illustrates connection of cable 182 to support frame 140A according to an embodiment of the invention. Support frame 140A comprises a slot 210 by which a low friction traveler 220 is free to move up and down aided by floats attached thereto. Cable 182 is connected to the traveler 220 via pin screw 230. As waves vertically displace the pods 120 within the pod chain 120A-N, the traveler 220 will move up and down the slot 210 accordingly. This enables the aft and forward pods 120A and 120N to freely move without resistance of cables 181 and 182 being attached to the support frames 140A and 140B. Connection of cable 181 to support frame 140A (as well as connection of cables 181 and 182 to support frame 140B) is accomplished in a similar manner. In other words, each support frame 140A and 140B includes two sets of slots 210 and travelers 220, each set disposed on opposite edges of the applicable support frame. In an embodiment of the invention, support frames 140A and 140B are configured with horizontal structural beams 240 that provide ample openings to allow waves to pass through and for mounting an optional service deck 250 (not shown in FIG. 1). In an optional embodiment of the invention, the wave energy converter system 100 further comprises a hoist 260 mounted to a pole 270, which is coupled to the buoyancy chambers 112A and 112B.

In an alternative embodiment of the invention, pin screw 230 is a powered screw drive which permits a cable 181 or 182 on one side or the other of the support frames 140A or 140B to be let out, while the other end is drawn in. This has the effect of causing the pods 120A-N to yaw along the axis of the backbone 110. The benefit of pod yawing is to fine-tune the pod response to waves for increased power transfer to the pod and reduce the extent of slap loads on the pods from steep waves.

Figure 3:
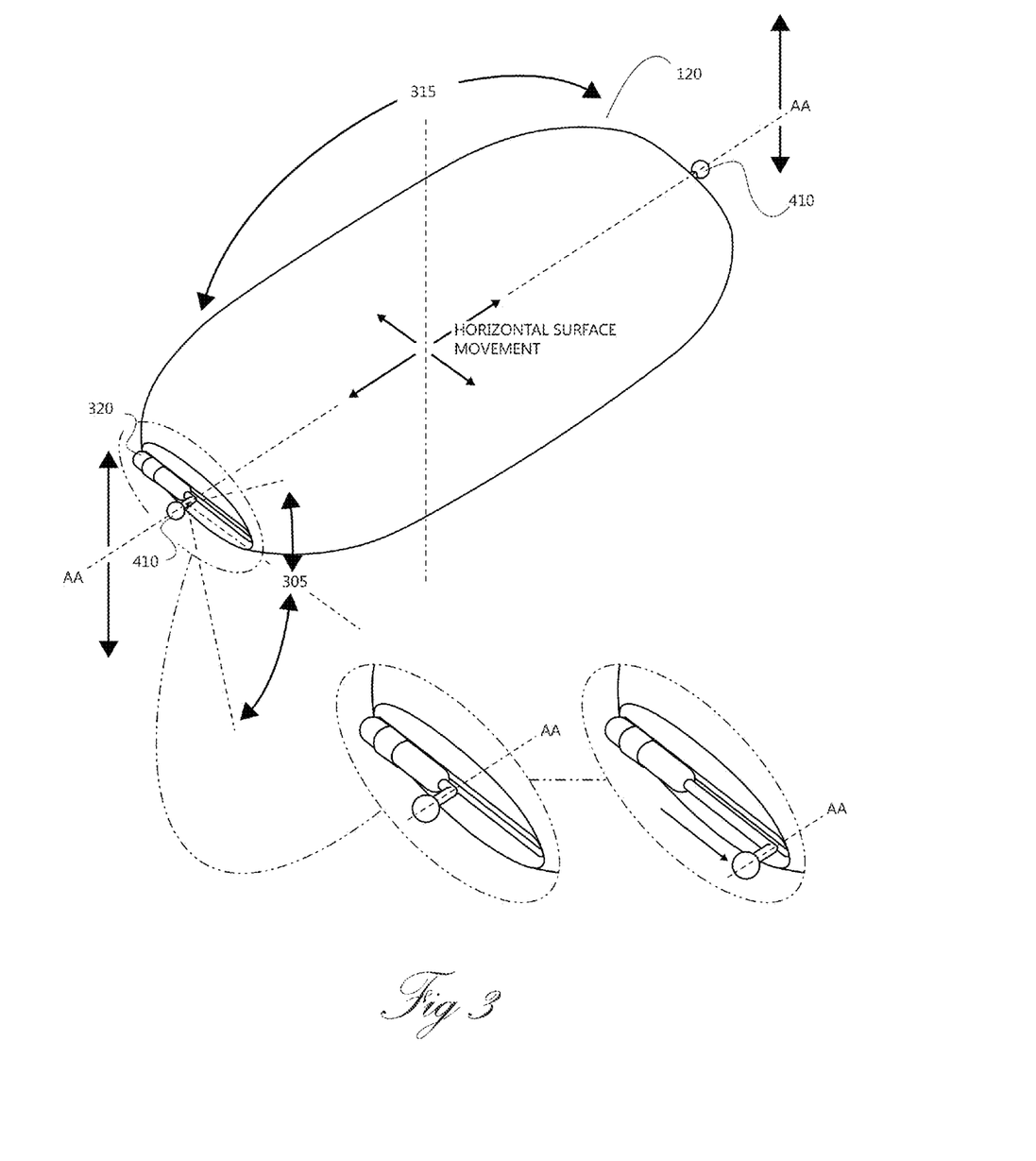
FIG. 3 illustrates an isometric view of a single pod in the wave energy converter system of FIG. 1.

FIG. 3 illustrates an isometric view of a pod 120 within the wave energy converter system 100 and shows pitch 305, roll 315 movement of the resilient Podchain system 120A-N. Here, ball joint 410 is shown on each end of pod 120. Ball joint 410 permits limited horizontal movement on the surface relative to the backbone. This resiliency reduces system stress and concentrates the forces of the wave on the power converter.

Figure 4:
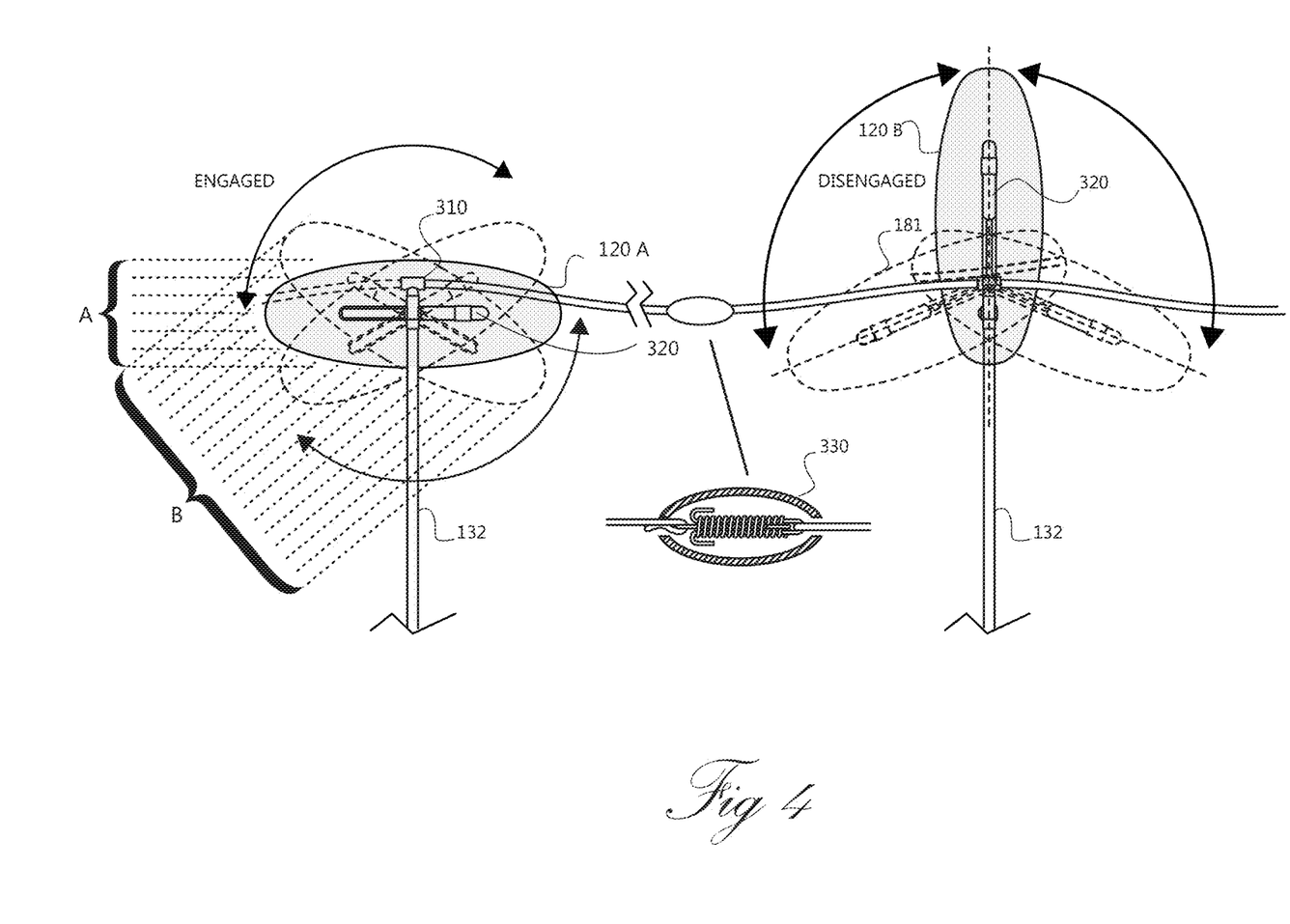
FIG. 4 illustrates a multi-position side view of two pods within the wave energy converter system of FIG. 1.

FIG. 4 illustrates a multi-position side view of two side by side pods 120A and 120B within the wave energy converter system 100. Pods 120A and 120B are attached by connector 310 to the cable 181 (or cable 182) on the pump piston shaft 132. At a pod's center of buoyancy (the pod pivot point and normal operating position) at the wide oval ends of the pod, the piston shaft 132 of a pod 120 is coupled by a ball connector to a sliding track ("Vaneloc") 320 mounted on the opposite ends of a pod 120. In this central position (pivot point) the pod 120A can pitch within a 90° degree arc, 45° degrees down or 45° degrees up. Under severe sea states, release of the Vaneloc 320 causes the ball connector on the sliding track to shift forward on pod 120B, and with the pod Vaneloc disengaged the pod may "weathervane" to the buoyancy and directional hydrodynamic forces of the wave, thus substantially reducing the impact of extreme wave forces on the entire wave energy converter system 100. This is similar to wind turbines "feathering" their blades in extreme wind conditions. The Vaneloc release into the disengaged state can be triggered by a central control command, or by a mechanical trigger (not shown) at a prescribed extended stroke position of the piston shaft 132. A pod released to the weathervaning position may be reinstated to its center of buoyancy operating position by a hydraulic or electromechanical drive in the Vanelocs (not shown). A pod released to a weathervane state (i.e., disengaged state), reduces system-wide structural loads through 1) reducing pod frontal exposure (A vs. B on Pod 120A to the force of the prevailing water flow, and 2) releasing Vaneloc allows the center of buoyancy of the pod to shift higher (Pod 120B) in the water column reducing the wave/buoyancy response. Therefore, when in weathervaning mode, the pod 120 will favor a vertical pitch position, which reduces the rate of pod volumetric displacement in waves and substantially reduces the wave heave loads on the system.

In an embodiment of the invention, cable 181 (as well as cable 182) comprise a spring mechanism 330 between each set of respective pods, e.g., pod 120A and pod 120B, and so on. Spring mechanism 330 permits a degree of movement between respective sets of pods to alleviate stress on cable 181 (or cable 182).

Figure 5:
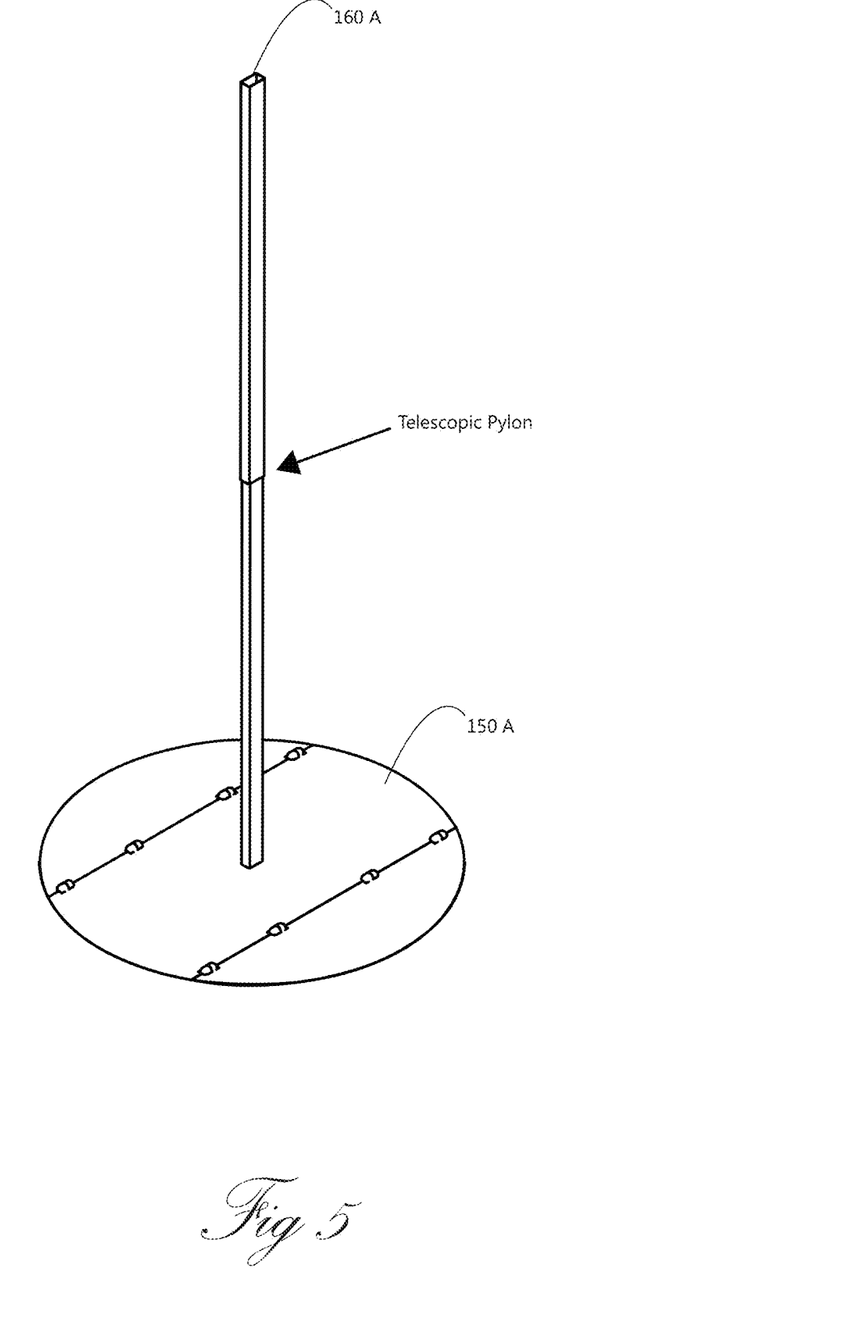
FIG. 5 illustrates a heave plate and respective telescoping pylon of the wave energy converter system of FIG. 1.

FIG. 5 illustrates the heave plate 150A and respective telescoping pylon 160A according to an embodiment of the invention. Heave plate 150B and telescoping pylon 160B are identical to heave plate 105A and telescoping pylon 160A. Here, the heave plates 150A and 150B are structural discs rigidly attached to the pylon. Pylons 160A and 160B are adjustable in length to lower or raise the surge plates 150A and 150B relative to the platform 110. The heave plates 150A and 150B resists the upward lift on the platform 110 produced by the pods 120A-N in rising waves. This resistance is the combination of flow resistance of the heave plate's surface, and the inertia of the water mass contained within a spherical volume approximately the radius of the heave plate.

Figure 6:
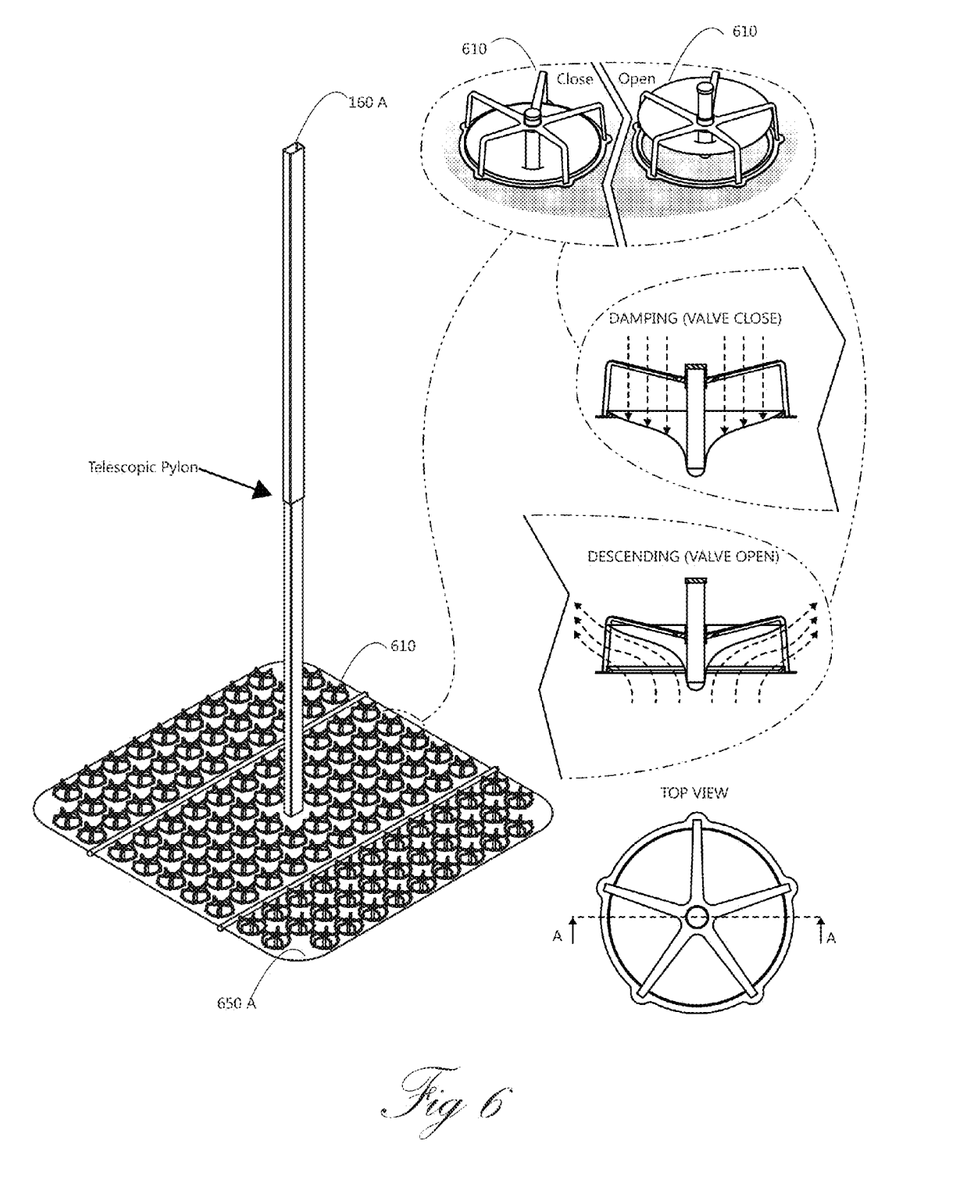
FIG. 6 illustrates a heave plate and respective telescoping pylon of the wave energy converter system according to an alternative embodiment of the invention.

FIG. 6 illustrates a heave plate 650A according to an alternative embodiment of the invention. As shown in FIG. 6, the heave plates have a number of one-way high flow rate valves 610 which, when tension is applied to the pylon the valves are closed and the heave plate resists the upward force as with heave plates 150A and 150B. On the back of the wave tension is released as the pods 120A-N descend and the high flow rate, heave plate valves open reducing the flow resistance to the heave plates and allowing them to drop and reposition for the next wave. The heave plate valves, when opened, have reduced flow resistance in descent, thereby allowing the heave plates to reposition quickly, and the valves to close to resist the upward force of the next incoming wave. The reduction to flow resistance of the heave plates as it sinks may also be provided by one-way flutter or other types of valves on the surface of the heave plates. It also shows the one-way high flow rate valves in the top right corner in a closed position (shown left) and an open position (shown right).

Figure 7:
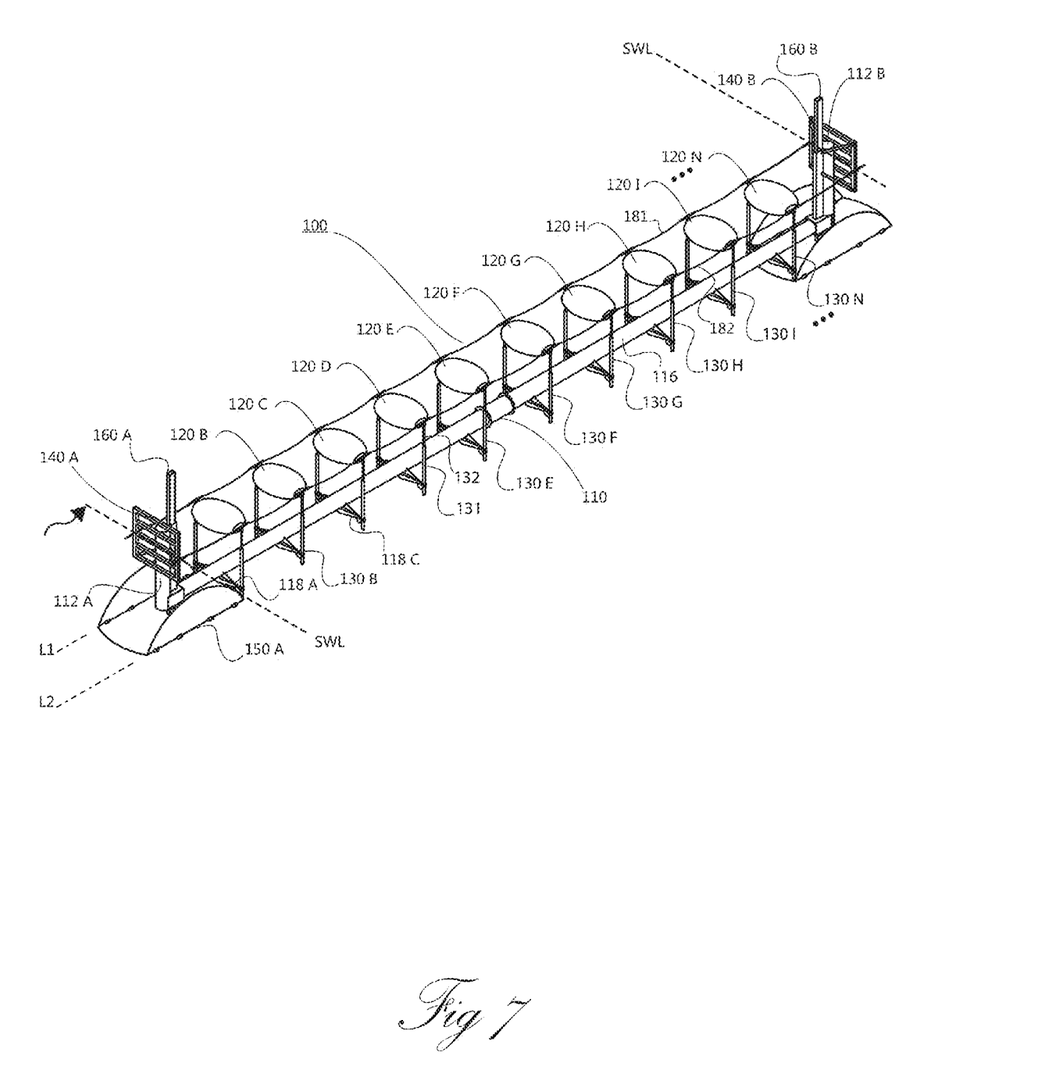
FIG. 7 illustrates the wave energy converter system with the heave plates in a folded state for transportation to or from a deployment site.

FIG. 7 illustrates the wave energy converter system 100 with the heave plates in a folded state for towing or transportation to or from a deployment site. Particularly, heave plates 150A and 150B are folded into a retracted position along fold lines L1 and L2 to minimize resistance to movement and permit entry to shallow depth deployment/retrieval quays. Pylons 160A and 160B have been retracted (or "jacked up") as shown in order to bring heave plates 150A and 150B close to backbone 110. In this retracted state, the wave energy converter system 100 can be towed from quayside shallow waters, to its final location, where the heave plates 150A and 150B are lowered and locked in their operating position.

Figure 8A:
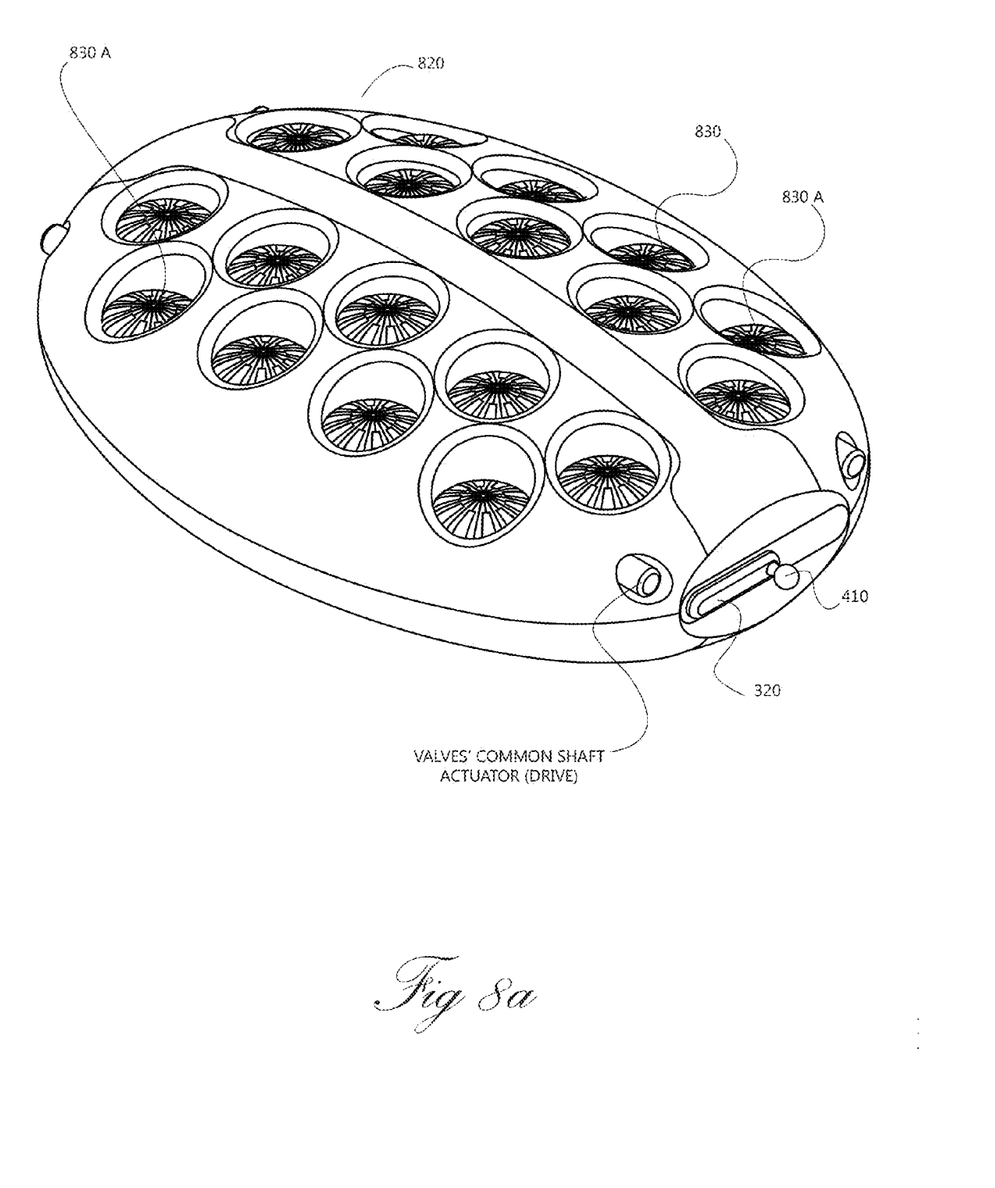
FIG. 8a/b illustrate a variable displacement pod according to an embodiment of the invention.
Figure 8B:
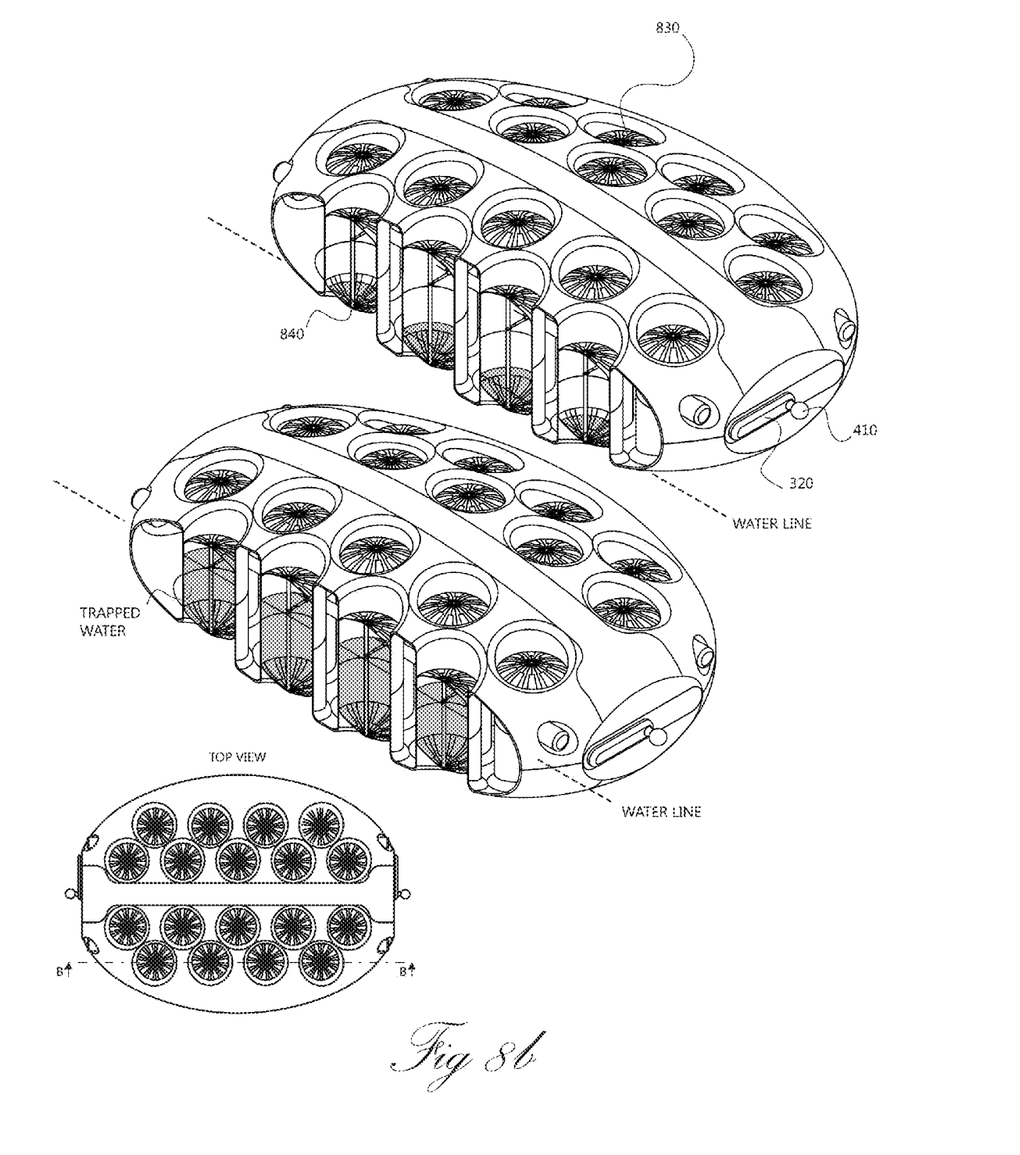

FIG. 8 illustrates a variable displacement pod 820 (or "Varipod") for use in the wave energy converter system 100 according to an alternative embodiment of the invention. The Varipod 820 significantly enhances the efficiency of a pod, by trapping air in chambers in the pod, at the bottom of a wave, thereby adding buoyancy, and flooding said chambers at the wave top, to add mass to the pod and benefit from the force of gravity as the pods drop with the wave to drive the power converter both as the pods rise and as they fall with a wave. The alternating use of the pod chamber to add buoyancy or replace the buoyancy volume with seawater results in increased pod power transfer to the power converter, with a small increase in the pod dry weight. FIG. 8A illustrates a top view of the Varipod 820. Here, multiple valves 830 are shown that permit the flow of air in and out of the Varipod 820. FIG. 8B illustrates a cutaway view of the Varipod 820. The chambers in the pod are cylindrical and extend from the bottom surface of the pods to the top surface, forming watertight pod structure integral with the chambers. At the top and bottom end of the chambers are caps with rotary valves on a common shaft actuated by a mechanical or hydraulic drive, programmed for valve opening and closing. Multiple water valves 840 are shown that permit the flow of water in and out of the Varipod 820. Each air valve 830 is connected to a respective water valve 840 by a common shaft actuating the respective valves.

At the wave bottom (through) the pod chambers have released the water ballast, allowing the pods to rise relative to the water surface. At this point the top and bottom valves close, trapping air in the chamber. The added buoyancy results in more lifting force of the pods as the wave rises. Near the wave top, the valves are opened and the restraining force of the power converter holds the pod semi-submerged while the chambers flood, as the wave tops and the valves close trapping water. As the wave falls away, the added mass of seawater in the chambers creates added gravity force to be harnessed by the power converter system. Nearing the wave through, the valves open, releasing the seawater and letting the pod rise, to then trap air as the valves close. The cycle then starts again.

To maximize the power generated, the power control system (not shown) is programmed to meet the prescribed pod operating volumetric displacement ("POVD") as the wave rises. This is accomplished by the power converter restraining the rise of the pod until the desired pod volumetric displacement is reached in the rising wave. Then, the power converter control allows the pod to rise with the wave at the prescribed pod displacement level, capturing the buoyancy lift force by the power converter. As the wave tops out and starts to fall away, gravity brings the pod down. The potential energy of the pod mass is harnessed by the power converter providing input torque to the generator which may be coupled to a flywheel or other form of short term storage. Wave topping and the wave trough, represent time intervals with little energy, as can be seen in an example of a 11 second wave period, where only 7 seconds may provide useful energy from a rising and falling pod. Energy storage thus provides a significant advantage in leveling out the short burst of high energy (pod rising) with the short burst of energy as the pod descends, resulting in more efficient, steady power generation.

The generator is torque controlled to achieve an optimized blend of the wave energy from rising and falling waves with stored energy released for a more levelized generator power output, and maintaining generator speed in a high efficiency range. The electric power generated is delivered to shore via a submarine cable.

In an embodiment of the invention, yawing of the pod chain 120A-N is based on the system as disclosed in United States Patent Application Publication No. 2011/0304144, which is owned by the present Assignee and describes gravity anchors on the lengthwise sides of the device using normal anchoring scopes. Yawing enables pod chain orientation to incoming waves to maximize energy conversion as wave direction changes and to minimize pod chain exposure by aligning perpendicularly to the wave front in the event of extreme wave conditions. The anchoring lines on each side run from the anchor to the aft end of the backbone and traverses across the backbone engaging with a motorized winch, exiting at the front end of the backbone and connecting to the same anchor. This is the same on both the port and starboard sides of the device. Upstream of the array of devices, a wave and wind sensor buoy signals the onboard controller to make adjustments to the yawing of the device to optimize or minimize exposure to the wave front. The motorized winch is activated by an onboard control system to operate in either clockwise or counter clockwise direction. As the coordinated winches operate, the device yaws to meet optimum exposure to the incoming wave. Under extreme wave conditions, the device will seek a perpendicular position to the wave front to minimize wave loading. The disclosure of United States Patent Application Publication No. 2011/0304144 is incorporated herein by reference in its entirety.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A wave energy converter system comprising:
   a submerged backbone structure, wherein the submerged backbone structure comprises a buoyancy chamber located at each longitudinal end of the submerged backbone structure and the submerged backbone serves as a keel and a ballast chamber,
   at each longitudinal end of the submerged backbone structure, one of two support frames is coupled to each buoyancy chamber;
   a plurality of interconnected pods arranged between the support frames and buoyancy chambers, and located vertically above the submerged backbone structure;
   for each pod in the plurality of interconnected pods, one or more power converters connected by a pivoting link to its respective pod, wherein each pod is coupled to react vertically against and relative to the backbone structure through its respective power converter;
   a first cable or chain coupling one end of each of the plurality of interconnected pods to the support frames;

a second cable coupling an opposite end of each of the plurality of pods to the support frames;

wherein displacement of the plurality of pods by wave energy drives the power converters to facilitate generation of electricity or high pressure sea water for desalination processing.

2. The system of claim 1, wherein the backbone structure is U-shaped.

3. The system of claim 1, wherein the buoyancy chamber at each end of the backbone structure is coupled to a heave plate via a pylon.

4. The system of claim 3, wherein the pylon has a variable length.

5. The system of claim 3, wherein the heave plate is foldable.

6. The system of claim 3, wherein the heave plate has one-way valves.

7. The system of claim 1, wherein the first cable and the second cable are coupled to an edge of a support frame via a traveler.

8. The system of claim 7, wherein the traveler is able to freely move in a slot disposed along the edge of a respective support frame.

9. The system of claim 1, wherein each power converter comprises a hydraulic pump or a mechanical drive to the generator.

10. The system of claim 1, further comprising a means for adjusting the yaw of the wave energy converter system.

11. A wave energy converter system comprising:
a U-shaped support structure, wherein the U-shaped support structure has a center of buoyancy located above its center of mass,
a plurality of interconnected pods that float vertically above the U-shaped support structure when submerged; and
for each pod in the plurality of interconnected pods, one or more power converters each connected by a pivoting link to its respective pod, wherein each pod is coupled to react vertically against and relative to the U-shaped support structure through its respective the power converters, the plurality of interconnected pods are coupled to one another via at least one cable or chain, and displacement of the plurality of interconnected pods by wave energy drives the power converters to facilitate generation of electricity or high pressure sea water for desalination processing.

12. The system of claim 11, wherein the U-shaped support structure is coupled to at least one heave plate via a pylon.

13. The system of claim 12, wherein the at least one heave plate is foldable.

14. The system of claim 12, wherein the at least one heave plate comprises water valves.

15. The system of claim 11, further comprising a means for adjusting the yaw of the wave energy converter system.

16. The system of claim 11, wherein each of the plurality of pods comprises one or more water valves for varying displacement of a pod.

* * * * *